Jan. 18, 1966 C. K. GRIEDER 3,229,995

FRAME CONSTRUCTION FOR GALLOPING HOBBY HORSES

Filed April 24, 1964

INVENTOR.
CHARLES K. GRIEDER
BY
Howard E. Thompson
ATTORNEY

United States Patent Office 3,229,995
Patented Jan. 18, 1966

3,229,995
FRAME CONSTRUCTION FOR GALLOPING HOBBY HORSES
Charles K. Grieder, 3635 Costilla Place, Littleton, Colo.
Filed Apr. 24, 1964, Ser. No. 362,230
4 Claims. (Cl. 280—218)

This invention relates to galloping hobby horses, generally of the type and kind disclosed in my Letters Patent No. 3,023,026, granted Feb. 27, 1962. More particularly, the present invention deals with the frame structure of devices of the character defined, wherein a greater galloping action is produced by virtue of the frame structure employed. Still more particularly, the invention deals with a frame structure wherein the stirrup support has a direct coupling engagement with the front post of the vehicle in accomplishing the greater action or movement of the vehicle.

The novel features of the invention will be best understood from the following description, when taken together with the accompanying drawing, in which certain embodiments of the invention are disclosed and, in which, the separate parts are designated by suitable reference characters in each of the views and, in which.

Figure 1:
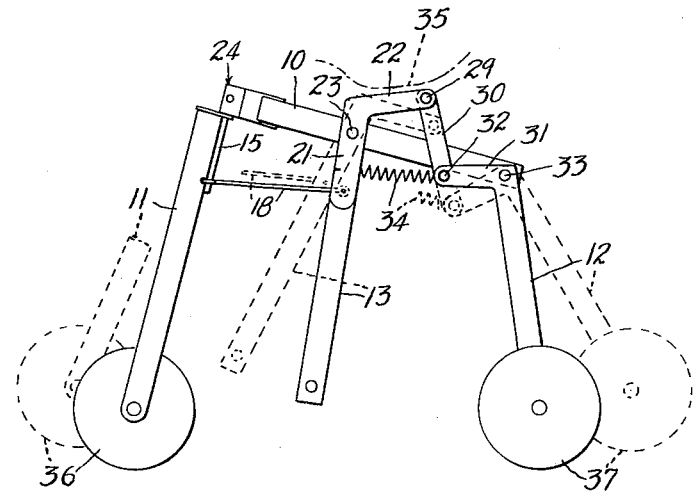
FIG. 1 is a diagrammatic side view generally outlining the frame structure of a galloping hobby horse, showing the frame structure in normal position in full lines and illustrating, in part, the galloping action of the frame structure in dotted lines.

In FIG. 1 of the drawing, I have indicated at 10 the main tubular body of the vehicle or hobby horse. At 11 is shown the post of the front wheel or leg unit. At 12 is shown the support for the rear wheels, only one of the wheels being diagrammatically shown and at 13 is shown the fender or stirrup support.

Figure 2:
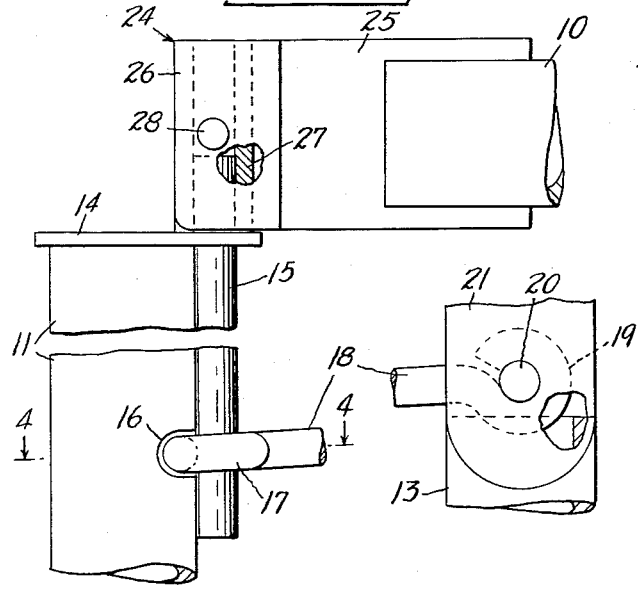
FIG. 2 is an enlarged detail view of the upper end of the front post showing its coupling engagement with the forward end of the tubular body of the vehicle and, further, illustrating, in part, coupling between the front post and the stirrup support of the frame, parts of the construction being broken away and in section.
Figure 4:
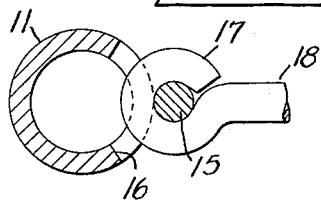
FIG. 4 is a section on the line 4—4 of FIG. 2.

The upper end of the post 11 has welded thereto a plate 14, to which is also welded a pivot pin 15, the pin being welded to the side of the post and extending longitudinally of the inner surface of the post and overlaps a recess 16 formed in said inner side of the post, as clearly noted in FIG. 4 of the drawing, so as to receive the looped end 17 of a connecting rod 18, the other end 19 of which is looped around a pin 20 fixed in plates 21 secured to the upper portion of the fender 13, as clearly illustrated in FIG. 2. It is here pointed out that the plates 21 constitute one end portion of substantially L-shaped levers 22 pivoted to the main frame 10, as seen at 23. Further structure of these levers will be later described.

Figure 3:
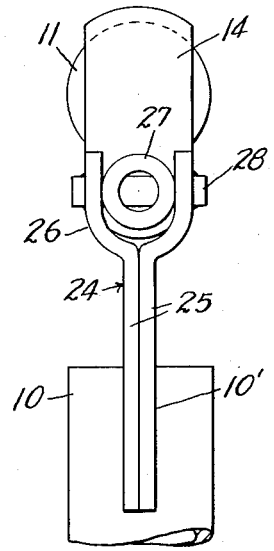
FIG. 3 is a plan view of the structure shown in FIG. 2.

At 24 I have shown a pivot portion at the forward end of the body 10. This pivot portion comprises a pair of plates 25, note FIG. 3, welded together and with their ends welded in notches 10' formed in the forward end of the frame 10. The outer ends of the plates 25 are offset to form a U-shaped portion 26, in which is arranged an elongated bearing sleeve 27 keyed in 26 by a pin 28 welded to 26. The upper end of the pivot pin 15 extends into the sleeve 27, as clearly noted in FIG. 2 of the drawing, so as to provide pivotal movement of the front wheel post 11 in the frame 10 in the operation of steering the vehicle or hobby horse, as in the patent heretofore identified.

Pivoted to the free ends of the levers 22, as at 29, is a link 30 which is pivoted to an offset arm 31, as seen at 32, extending from the pivot 33 of the rear wheel support 12 to the main frame 11, as clearly noted in FIG. 1 of the drawing.

Arranged between the pivot 32 and the plate 21 is a spring 34 normally tensioned to support the parts in the full line position of FIG. 1. In FIG. 1, I have indicated, in dot-dash lines, in part, the seat 35 of the vehicle or hobby horse, which is supported directly upon the levers 22, again, as illustrated in the patent above identified. It will, thus, be apparent that, in action of the occupant of the hobby horse up and down upon the frame in the downward movement against the action of the springs 34, not only will the rear wheel support 12 move rearwardly, but the forward movement of the stirrup support 13 will also move the front post forwardly, as indicated, in part, in dotted lines in FIG. 1 of the drawing, by virtue of the direct coupling of the rod 18 between 11 and 13. In this operation, it will be understood that the sleeve 27 will swing on the pivot pin 28 arranged in the U-shaped portion 26 of 24. By reason of the added spread, a greater distance can be traveled in galloping operation of the horse. In FIG. 1 of the drawing, I have indicated diagrammatically at 36 the front wheel supported upon the lower end 11 and at 37 I have indicated one of the two rear wheels supported in connection with the lower portion of 12.

Considering FIG. 4 of the drawing, it will appear that the recess 16 formed in the post 11 will be sufficient to allow turning of the post 11 in the operation of steering the vehicle or horse.

Having fully described my invention, what I claim as new and desire to secure by Letters Patent is:

1. In vehicles of the character defined, a frame structure comprising a main body part, a front post pivotally and rotatably supported in connection with the forward end of the body part, the front post supporting at its lower end a front wheel, means pivotally supported in connection with the rear end of the body part for supporting rear wheels of the frame, a stirrup support pivotally coupled with the body part intermediate its ends, the upper portion of the support including a lever having a link connection with the rear wheel support means, tensional means coupled with the stirrup support and the connection of the link with said rear wheel support means, a connecting rod pivoted to the front post and coupled with a pin on said stirrup support spaced with respect to the pivot of the stirrup support, said rod placing the stirrup support in direct operative engagement with the front post whereby, in operation of the vehicle, the front post is advanced forwardly in swinging movement of the stirrup support on said body part, the pivotal coupling of the front post with the forward end of said body part comprising a pivot portion fixed to the forward end of the body part, the pivot portion having a sleeve pivotally mounted thereon, and a pivot pin fixed to the post and having a bearing support in said pivoted sleeve.

2. A frame structure as defined in claim 1, wherein said connecting rod has one end coupled with said pivot pin, and the front post being recessed to clear that part of the rod mounted on said pin in rotation of the front post in said sleeve.

3. A frame structure as defined in claim 2, wherein a plate is secured to the upper end of the post and to said pivot pin, and the pivot portion at the forward end of the body part being arranged over said plate.

4. In vehicles of the character defined, a vehicle frame structure comprising an elongated body part, wheel supporting means pivotally supported in connection with opposed ends of the body part, a seat actuated lever structure pivotally supported on the body part intermediate its ends, said lever structure including a depending stirrup support, a linkage between the lever structure and the means pivotally supported in connection with the rear end of the body part, tensional means between said last named means and the stirrup support for normal support of the vehicle frame, a connecting rod placing the stirrup support in operative connection with the means pivotally supported in connection with the forward end of the body part for actuation of said last named means as the stirrup support is moved forwardly in the action of said frame, means for rotatably mounting the last named means in connection with the forward end of said body part for steering the vehicle, said last named means comprising a pivot pin, and said connecting rod being rotatably coupled with said pivot pin.

References Cited by the Examiner
UNITED STATES PATENTS

| | | | |
|---|---|---|---|
| 1,619,438 | 3/1927 | Schoenke | 280—1.183 |
| 2,911,226 | 11/1959 | Grieder | 280—1.183 |

FOREIGN PATENTS

| | | |
|---|---|---|
| 410,664 | 3/1925 | Germany. |

LEO FRIAGLIA, *Primary Examiner.*